(12) United States Patent
Maiman et al.

(10) Patent No.: US 10,803,371 B1
(45) Date of Patent: *Oct. 13, 2020

(54) TRANSACTION CARD WITH INTEGRATED STAND

(71) Applicant: Capital One Services, LLC, McLean, VA (US)

(72) Inventors: Tyler Maiman, New York, NY (US); Max Miracolo, New York, NY (US); Joshua Edwards, Philadelphia, PA (US)

(73) Assignee: Capital One Services, LLC, McLean, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/727,575

(22) Filed: Dec. 26, 2019

Related U.S. Application Data

(63) Continuation of application No. 16/527,878, filed on Jul. 31, 2019, now Pat. No. 10,558,902.

(51) Int. Cl.
| | | |
|---|---|---|
| *G06K 19/00* | (2006.01) | |
| *G06K 5/00* | (2006.01) | |
| *G06K 19/067* | (2006.01) | |
| *B42D 25/20* | (2014.01) | |

(52) U.S. Cl.
CPC ........... *G06K 19/067* (2013.01); *B42D 25/20* (2014.10)

(58) Field of Classification Search
USPC .......................... 235/380, 449, 493
See application file for complete search history.

(56) References Cited

U.S. PATENT DOCUMENTS

| | | |
|---|---|---|
| 4,784,268 A | 11/1988 | Perchak |
| 7,147,151 B2 | 12/2006 | Lasch et al. |
| 2004/0148837 A1 | 8/2004 | Lewis |
| 2009/0093154 A1 | 2/2009 | Shen et al. |
| 2010/0051705 A1* | 3/2010 | Albers ............... A63H 3/52 235/494 |
| 2013/0220879 A1* | 8/2013 | Glass ............... B65D 27/00 206/767 |
| 2013/0270413 A1 | 10/2013 | Wilber et al. |
| 2014/0063715 A1 | 3/2014 | Hwang |
| 2014/0143958 A1* | 5/2014 | Barr ............... B25F 1/00 7/138 |
| 2016/0258542 A1 | 9/2016 | Hoskins |

* cited by examiner

*Primary Examiner* — Tuyen K Vo
(74) *Attorney, Agent, or Firm* — Pillsbury Winthrop Shaw Pittman LLP

(57) ABSTRACT

The disclosed embodiments generally relate to a transaction card with an integrated card stand. The transaction card comprises a substrate having a card thickness, and first and second card surfaces, the second card surface being substantially coextensive with the first card surface. The transaction may further comprise a card stand pivotable relative to the second card surface and having a stand thickness.

20 Claims, 5 Drawing Sheets

TRANSACTION CARD WITH INTEGRATED STAND

CROSS-REFERENCE TO RELATED APPLICATIONS

This application is a continuation of U.S. Patent application Ser. No. 16/527,878, filed on Jul. 31, 2019 (pending). The aforementioned application is incorporated herein by reference in its entirety.

TECHNICAL FIELD

The present disclosure generally relates to a transaction card, and particularly, to a transaction card with an integrated card stand.

BACKGROUND

Transaction cards, such as credit and debit cards, have become a primary means for individuals to complete transactions involving data exchange. Many other forms of cards are also widely used, such as identification cards, loyalty cards, prescription cards, insurance cards, etc. These forms of transaction cards are typically formed of a thin and substantially flat plastic substrate such that they can easily be swiped through a card reader, stored in a wallet or purse, or the like.

In some instances, it may be desirable to stand a transaction card in an upright position. For example, a customer at a restaurant may wish to place a credit card in an upright position on their table. This may signal to the waitstaff that the customer is ready for his or her check or ready to pay the check. Traditional transaction cards are not designed to be placed in an upright position without being propped up by another object. For example, to place a credit card in an upright position, a customer would have to lean the card against a glass, the check holder, or some other object. Another object may not always be available, and even if it is, the transaction card may easily fall or slide down. Moreover, placing the transaction card against an object may obscure the transaction card from view, or make it less pronounced.

Accordingly, in view of these and other deficiencies, solutions are needed for placing a transaction card in an upright position. Solutions should advantageously allow the transaction card to be propped upright using a card stand component integral to the card, without the need for a separate stand or object. Further, the transaction card should allow for a stowed position, where the card is useable in a card reader or can be stored in a wallet or purse. Finally, the transaction card should have means to maintain the card in the stowed position and prevent the card stand component from drifting into an open position.

SUMMARY

In the following description, certain aspects and embodiments of the present disclosure will become evident. It should be understood that the disclosure, in its broadest sense, may be practiced without having one or more features of these aspects and embodiments. It should also be understood that these aspects and embodiments are merely exemplary.

Disclosed embodiments may include a transaction card. The transaction card may comprise a substrate having a card thickness and first and second card surfaces, the second card surface being substantially coextensive with the first card surface. A card stand may be pivotable relative to the second card surface and have a stand thickness.

In another embodiment a method for forming a transaction card with a card stand is disclosed. The method may include forming a substrate of the transaction card having a first card surface and a second card surface, forming a card stand configured to hold the transaction card in an upright position, and forming a hinge for pivoting the card stand relative to the second card surface.

The foregoing general description and the following detailed description are exemplary and explanatory only and are not restrictive of the claims.

It is to be understood that both the foregoing general description and the following detailed description are exemplary and explanatory only, and are not restrictive of the disclosed embodiments, as claimed.

BRIEF DESCRIPTION OF THE DRAWINGS

The accompanying drawings, which are incorporated in and constitute a part of this specification, illustrate several embodiments and, together with the description, serve to explain the disclosed principles. In the drawings.

DESCRIPTION OF THE EMBODIMENTS

The present disclosure provides a transaction card with an integrated card stand. The card stand may be pivotable about an axis on the transaction card between a stowed position and a deployed position. When the card stand is in the stowed position, the transaction card may function as a normal transaction card, for example to make a purchase or complete a financial transaction. When the card stand is in the deployed position, the card stand may hold the transaction card in a raised position.

Deploying a transaction card with a card stand or "kick stand" may overcome several technological problems relating to efficiency, convenience, and functionality associated with use of the transaction card. For example, when a customer at a restaurant wishes to pay their bill, the card stand may be used to prop the transaction card in an upright position. The customer may place the upright transaction card on their table to signal to the waitstaff that the customer is ready for their check. Similarly, once the customer has received and reviewed their check, the transaction card may be placed on the table or on top of the check to signal to the waitstaff that they are ready to pay the check using the transaction card. In other embodiments, the card stand may be used to display information on the surface of the transaction card. For example, if the transaction card is an identification card or another type of transaction card with information displayed on the surface, the cardholder may wish to prop the card in an upright position to display the information more clearly. In other embodiments, the card stand may facilitate other transactions using the card. For example, if the transaction card is equipped with a communication device (e.g., NFC, Bluetooth, etc.) or other transaction information (e.g., a barcode, QR code, etc.), propping the transaction card in an upright position may signal that the cardholder wishes to engage in a transaction (e.g., NFC payment, scanning a rewards card, etc.) and may further facilitate the transaction by making the card more accessible for scanning or otherwise completing the transaction.

Additional aspects of the disclosed embodiments are set forth below in this disclosure. Reference will now be made in detail to exemplary embodiments, examples of which are illustrated in the accompanying drawings and disclosed herein. Wherever convenient, the same reference numbers will be used throughout the drawings to refer to the same or like parts. In the following description, certain aspects and embodiments of the present disclosure will become evident. It should be understood that the disclosure, in its broadest sense, could be practiced without having one or more features of these aspects and embodiments. It should also be understood that these aspects and embodiments are merely exemplary.

Figure 1A:
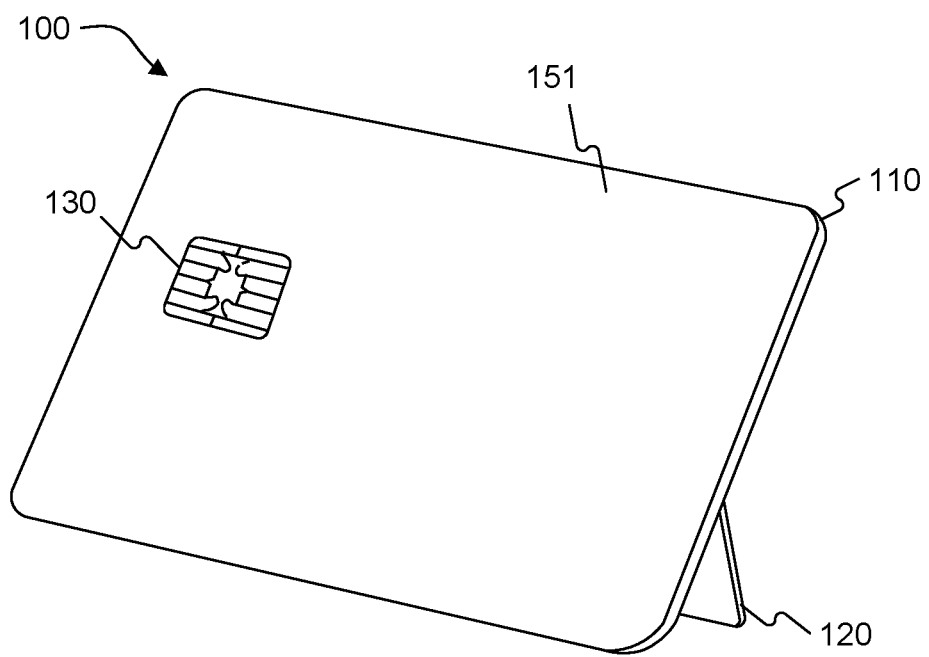
FIG. 1A illustrates a front view of an exemplary transaction card in an upright position, consistent with the disclosed embodiments
Figure 1B:
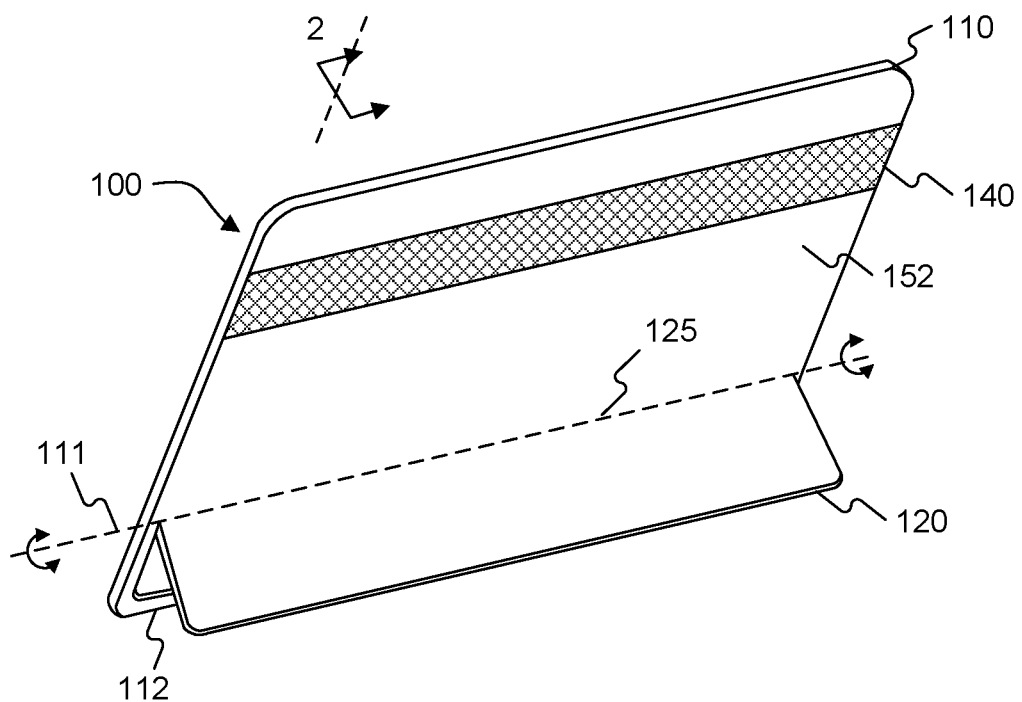
FIG. 1B illustrates a rear view of an exemplary transaction card in an upright position, consistent with the disclosed embodiments.

FIGS. 1A and 1B illustrate an exemplary transaction card with a card stand consistent with the disclosed embodiments. FIG. 1A illustrates a front view of the exemplary transaction card 100 in an upright position, consistent with the disclosed embodiments. Transaction card 100 may include a substrate 110 comprising the main body of transaction card 100, and a card stand 120. Transaction card 100 may have a first card surface 151 on the front of the card, as shown. Transaction card 100 may be any physical card product configured to provide information, such as financial information (e.g., card numbers, account numbers, etc.), quasi-financial information (e.g., rewards balance, discount information, etc.), and/or individual-identifying information (e.g., name, address, etc.), to another device. Examples of transaction cards include, but are not limited to, credit cards, debit cards, gift cards, rewards cards, frequent flyer cards, merchant-specific cards, rewards cards, travel cards (e.g., a train pass, a bus pass, etc.), discount cards, insurance cards, identification cards, and driver's licenses. Accordingly, the term "transaction" should be construed broadly to include any presentation or transfer of information associated with the transaction card.

As shown, transaction card 100 may be placed in an upright position using card stand 120. Placing transaction card in the position shown in FIG. 1A may indicate that a user of transaction card 100 is ready to engage in a transaction using transaction card 100. For example, the user may wish to pay a bill at a restaurant, participate in a rewards program, provide insurance information (e.g., at a doctor's office), pay a bus or train fare, pay a taxi fare, or the like. The upright position may also facilitate such a transaction, for example, by making transaction card 100 easier to pick up, making information on first card surface 151 easier to read, making a scannable code (e.g., a bar code, QR code, etc.) easier to scan, making a communication with transaction card 100 (e.g., NFC, Bluetooth™, etc.) more accessible, or various other benefits. Placing transaction card 100 in the upright position may further indicate a condition more broadly associated with transaction card 100 but not necessarily related to a transaction. As an illustrative example, placing a loyalty card on a table at a restaurant may indicate that a customer wishes to use a perk associated with the loyalty card, such as getting a free desert, etc. In other instances, placing transaction card 100 in the upright position may be used to display information. For example, if transaction card 100 is an identification card, transaction card 100 may be used as a nametag or other means of identifying the user, a business or corporation affiliated with the user, or the like.

FIG. 1B illustrates a rear view of the exemplary transaction card 100 in the upright position consistent with the disclosed embodiments. As shown in FIG. 1B, transaction card 100 may further include a hinge 125 disposed between card stand 120 and transaction card 100, and card stand 120 may be pivotable about hinge 125. Hinge 125 may comprise a hinge axis 111 and card stand 120 may pivot about hinge axis 111. Hinge axis 111 may be substantially parallel to a length of card substrate 110 and/or a lower edge 112 of transaction card 100, as shown in FIG. 1B. Alternatively, hinge axis 111 may be perpendicular to lower edge 112 of transaction card 100 or at an angle relative to lower edge 112.

Transaction card 100 may further include components to facilitate completing a transaction, such as magnetic strip 140 or smart card contact 130 (FIG. 1A). Transaction card 100 may include other components for facilitating a transaction, such as a hologram, a signature block, a name, an account or identification number, an expiration date, a card verification value (CVV) code, a photograph, a barcode, a QR code, or various other card features not shown in FIG. 1A or 1B. Transaction card 100 may have a second card surface 152 on the rear of the card, as shown. Second card surface 152 may be substantially coextensive with first card surface 151 (e.g., may share the same outside boundary) and may form two sides of transaction card 100. It is understood that the components shown in FIGS. 1A and 1B are merely exemplary and other configurations may exist. Further, transaction card 100 may not include all of the features shown or may include additional features not shown in the figures.

The physical properties of transaction card 100 (e.g., size, flexibility, location of various components included in the card) may meet various international standards, including, for example, ISO/IEC 7810, ISO/IEC 7811, ISO/IEC 7812, ISO/IEC 7813, ISO/IEC 7816, ISO 8583, ISO/IEC 4909, and ISO/IEC 14443. For example, transaction card 100 may have a width of approximately 85.60 mm, a height of approximately 53.98 mm, and a thickness of approximately 0.76 mm, as specified in ISO/IEC 7810. In some embodiments, transaction card 100 may be thicker as to accommodate various features of transaction card 100, such as card stand 120. For example, transaction card 100 may include one or more raised surfaces, bumps, or the like to accommodate hinge 125 or card stand 120. In other embodiments, the transaction card 100 may have a substrate 110 with a uniform thickness, while supporting one or more features (including hinge 125 and card stand 120). It would be apparent to one of skill in the art that other dimensions and layouts of card components of transaction card 100 are possible as well.

Substrate 110 may form the main body of transaction card 100. Substrate 110 may be formed of a single component or may be formed from multiple components. In some embodiments, substrate 110 may be formed of multiple layers or card substrates joined together. For example, substrate 110 may be formed of a front card substrate comprising first card surface 151 and a rear card substrate comprising second card surface 152. In such embodiments, hinge 125 may be disposed between card stand 120 and the second card substrate, as discussed in greater detail below. The front card substrate and rear card substrate may be joined together in various ways, including an adhesive, interconnecting features, fasteners, and/or any other types of joining techniques or mechanisms. One or more electronic components may also be disposed within substrate 110, including, for example, a microchip, an EMV chip, an embedded NFC antenna, a Bluetooth™ device, a processor, a memory, a power supply, etc. Where substrate 110 is formed of multiple card substrates, the electronic component(s) may be disposed between the card substrates.

Substrate 110 may be constructed of various materials suitable for a transaction card. For example, transaction card 100 may be manufactured out of plastic such as polycarbonate (PC) or polyvinyl chloride (PVC). Various other materials may also be used, including soft touch plastic, metal (e.g., aluminum, etc.), fiber composite materials, resin, etc. In some embodiments, transaction card 100 may include additional material features, such as coverings (e.g., a silicone overmold), veneers (e.g., a wooden veneer), finishes (e.g. an oil-slick aluminum finish), or the like. In embodiments where substrate 110 is formed of multiple layers or card substrates, each card substrate may be formed of the same material. Alternatively, each substrate may be formed of a different material. For example, the rear card substrate may be formed of a plastic, such as polycarbonate (PC), whereas the front card substrate may be formed of a separate material, such as aluminum.

Figure 2:
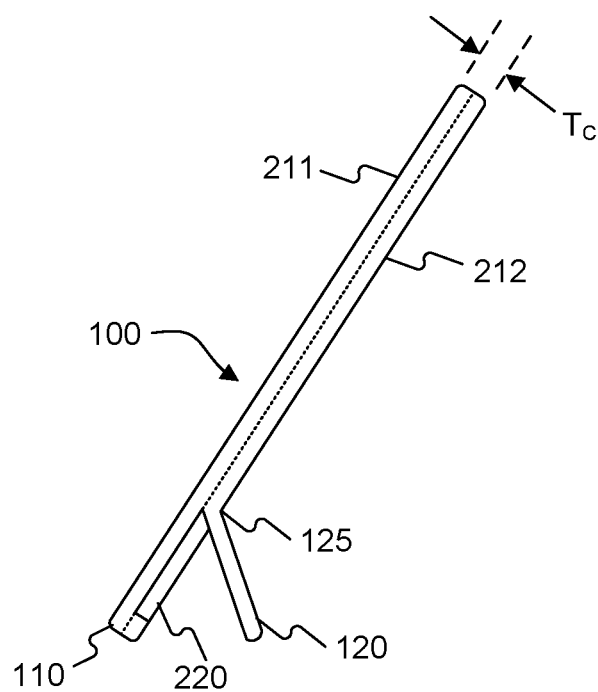
FIG. 2 illustrates a cross section view of an exemplary transaction card with a card stand, consistent with the disclosed embodiments.

FIG. 2 illustrates a cross section view of an exemplary transaction card 100 in an upright position consistent with the disclosed embodiments. The cross section view of transaction card 100 shown in FIG. 2 is as indicated by the cross section callout shown in FIG. 1B. Transaction card 100 and/or substrate 110 may have a card thickness ($T_C$), which may be defined by the various standards above (e.g., approximately 0.76 mm). Card stand 120 may be pivotable between a stowed position in which card stand 120 is substantially parallel to transaction card 100, and a deployed position in which card stand 120 may be angled outward relative to transaction card 100. In the deployed position, transaction card 100 may be held upright, as shown. As used herein, the term "upright" may not necessarily mean completely vertical. As shown in FIGS. 1A and 1B, transaction card 100 may be held upright at any angle suitable to make transaction card 100 more visible and/or accessible when placed on a surface. For example, transaction card 100 may be positioned at an angle ranging between 30 degrees and 90 degrees from a horizontal surface. Accordingly, card stand 120 may rotate outwards from substrate 110 an any angle suitable to maintain transaction card 100 in the upright position. For example, card stand 120 may rotate anywhere between 0 degrees from substrate 110 (in which card stand 120 is in a stowed position) to 90 degrees from substrate 110 (in which card stand 120 is in a deployed position). Various other angles may also be used. Card stand 120 may not necessarily have a specified deployed angle and the angle may depend on hinge 125, the material of card stand 120 and/or substrate 110, or various other factors. For example, the deployed angle may be limited based on the construction of hinge 125, which may resist movement of card stand 120 beyond a given outward angle. In some embodiments, this limit may be based on the geometry of the hinge, a defined detent, or any other known method of limiting outward travel of card stand 120 about hinge 125.

Card stand 120 may be formed of any substantially rigid material suitable to hold transaction card in an upright position. Similar to substrate 110, card stand 120 may be formed out of plastic such as polycarbonate (PC) or polyvinyl chloride (PVC) or various other materials, including soft touch plastic, metal (e.g., aluminum, etc.), fiber composite materials, resin, etc. Card stand 120 may be formed of the same or different materials as substrate 110. In some embodiments, card stand 120 and/or substrate 110 may have a gripping surface or material along a bottom edge (e.g., lower edge 112) configured to prevent transaction card 100 from slipping when placed in the upright position. For example, card stand 120 and substrate 110 may have a rubberized bottom edge (e.g., lower edge 112) that is placed on the table when transaction card 100 is in the upright position. Card stand 120 may have a generally rectangular shape, as shown in FIGS. 1A and 1B, or may have a variety of other shapes. For example, card stand 120 may have a shape that is generally a triangle, trapezoid (e.g., parallelogram, rhombus, square, etc.), circle, ellipse, stick, tube, or any other shape.

In some embodiments, card stand 120 may be integrally formed with substrate 110 as a single piece. For example, card stand 120 and substrate 110 may be molded as a single component. Card stand 120 may be formed by processing substrate 110 further, for example, by cutting or otherwise separating card stand 120 at least partially from substrate 110. In embodiments where substrate 110 is optionally formed of multiple layers or card substrates (as indicated by the dashed line in FIG. 2), card stand 120 may be integrally formed with one of the layers or card substrates. For example, substrate 110 may comprise a front card substrate 211 (comprising first card surface 151) and a rear card substrate 212 (comprising rear card surface 152) and card stand 120 may be integrally formed with rear card substrate 212. Front card substrate 211 and rear card substrate 212 may include suitable thicknesses to form the two sides of the card. For example, the two card substrates 211, 212 may include substantially the same thickness, each forming one-half of the card thickness ($T_C$). Alternatively, the two card substrates 211, 212 may have different thicknesses, which when formed together, form the overall thickness $T_C$ of card substrate 110. In such embodiments, hinge 125 may be a bendable portion of rear card substrate 212 and/or card stand 120, such as a living hinge, described in more detail below with respect to FIG. 4A. Accordingly, rear card substrate 212 and/or card stand 120 may be constructed from a substantially flexible or nonbrittle material such that card stand 120 may be stowed and deployed multiple times through the life of transaction card 100.

Transaction card 100 may further include at least one recess 220 for receiving card stand 120, as shown in FIG. 1B and FIG. 2. Recess 220 may extend across second card surface 152 and may extend into substrate 110. Card stand 120 may be disposed within recess 220 when in the stowed position. In some embodiments, recess 220 may be cut or milled out of substrate 110 or may be molded into substrate 110. In embodiments where card stand 120 is integrally formed with rear card substrate 212, recess 220 may be exposed when card stand 120 is pivoted into the deployed position, and the volume of recess 220 may be such that it is sized to accommodate card stand 120 therein when in the stowed position.

Figure 3:
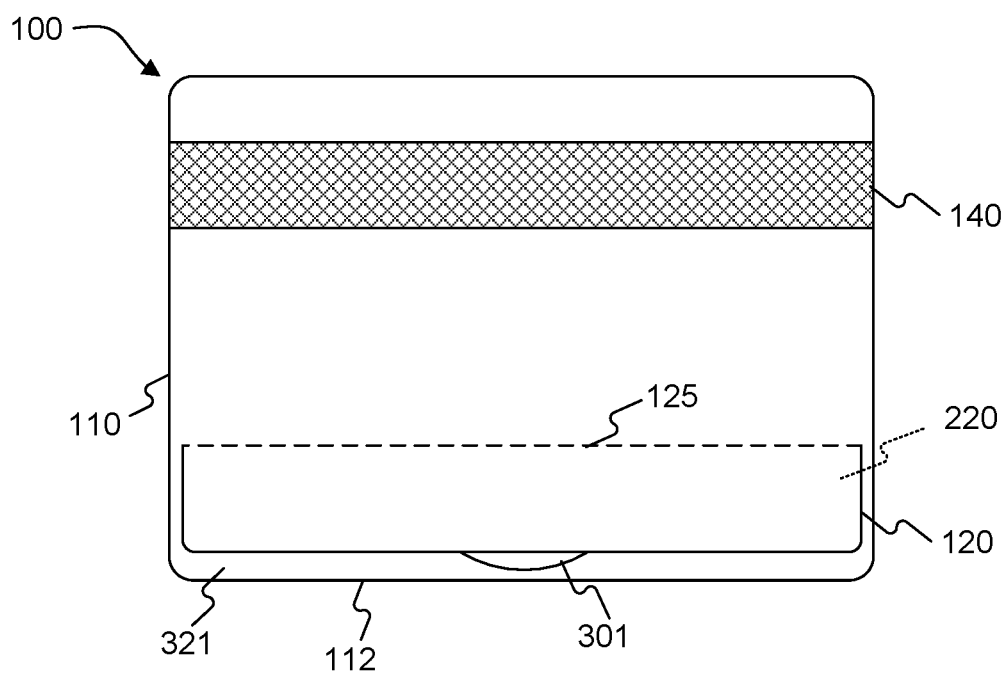
FIG. 3 illustrates an exemplary transaction card with a card stand in a stowed position, consistent with the disclosed embodiments.

FIG. 3 illustrates an exemplary transaction card 100 in a stowed position consistent with the disclosed embodiments. As shown, card stand 120 may be stowed within recess 220. Card stand 120 may extend across a portion of the length of transaction card 100, thus leaving portions of substrate 110 around the perimeter of transaction card 100 that are not part of card stand 120, as shown in FIG. 3. In other embodiments, card stand 120 may extend the full length of transaction card 100. As shown in FIG. 3, a ledge 321 may be disposed between lower edge 112 of transaction card 100 and card stand 120. Ledge 321 may be a portion of substrate 110, rear card substrate 212, or front card substrate 211, or may be a separate component. Ledge 321 may provide structural support for transaction card 100 and/or card stand 120. Ledge 321 may further interact with card stand 120 to hold card stand 120 in the stowed position, as described in more detail with respect to FIG. 5.

Transaction card 100 may further comprise an access feature 301 to facilitate operation of card stand 120. For example, access feature 301 may be a notch or indentation, as shown in FIG. 3, allowing a user to apply leverage on card stand 120 to release card stand 120 from its stowed position. For example, a user may pry card stand 120 from the stowed position using a finger, fingernail, or a utensil. While the notch is shown on ledge 321, the notch may also be formed on card stand 120, or various other portions of transaction card 100 (e.g., on rear card substrate 212, on the side of card stand 120, etc.). In some embodiments, access feature 301 may be a tab, handle, ledge, groove, or other feature allowing an edge of card stand 120 to be more easily accessed and for a user to more easily move card stand 120 from the stowed position. For example, card stand 120 may be equipped with a raised tab allowing the user to apply a force to card stand 120 to release it from a stowed position. Access feature 301 may also be disposed on front card substrate 211. For example, access feature 301 may be a hole extending through front card substrate 211 to allow card stand 120 to be pushed out from the other side. Various other access features known to one of skill in the art may be used.

As shown in FIG. 3, magnetic strip 140 may extend substantially across second card surface 152 and substantially parallel to lower edge 112 of transaction card 100. Magnetic strip 140 may be used to provide information to a card reader device, such as an ATM, merchant device, etc. For example, a user may swipe card 100 through the card reader to complete a financial transaction, make a balance inquiry, use rewards points, provide identity information, etc. Hinge 125 (and hinge axis 111) may be offset from magnetic strip 140 to allow transaction card 100 to be swiped without interference from card stand 120. Various other components or features of transaction card 100 (e.g., a hologram, signature block, a card verification value (CVV) code, a photograph, a barcode, a QR code, etc.), including transaction components disposed within substrate 110, may similarly be offset from hinge axis 111 to avoid interference between these components or features and the structure of hinge 125 and/or card stand 120. This may include, for example, offsetting these components or features from hinge 125 and/or card stand 120 such that the features do not overlap with hinge 125 and/or card stand 120 along transaction card 100.

Figure 4A:
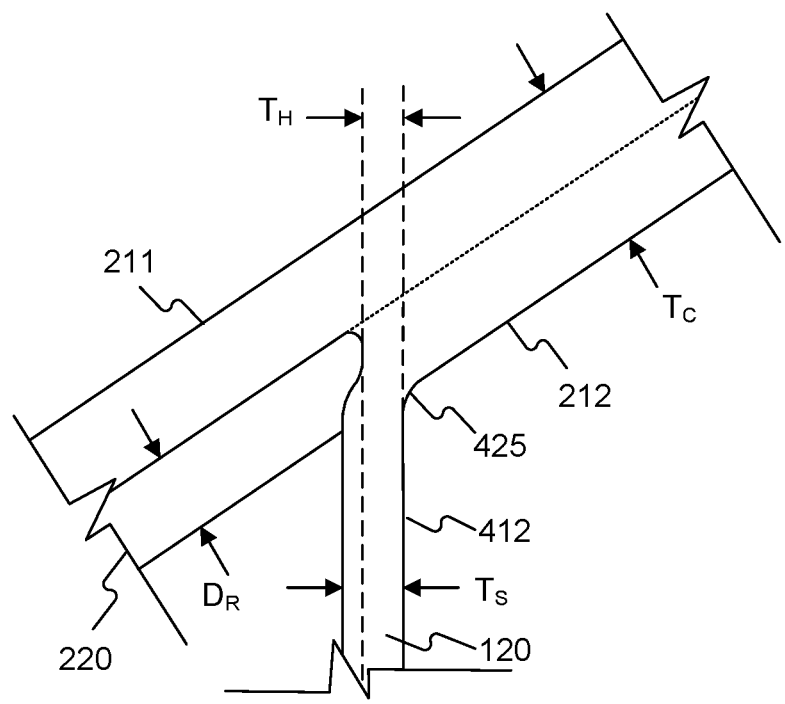
FIG. 4A illustrates an exemplary living hinge consistent with the disclosed embodiments.
Figure 4B:
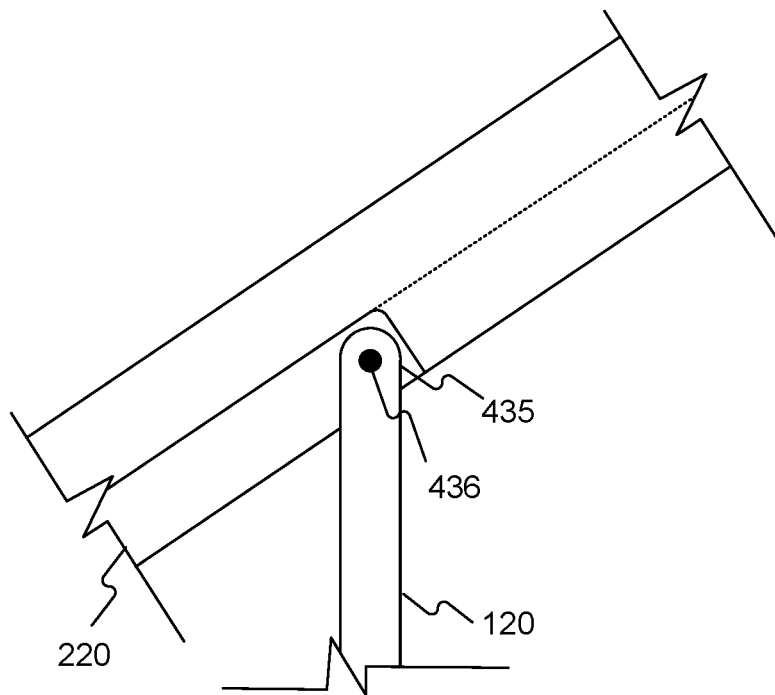
FIG. 4B illustrates an exemplary mechanical hinge consistent with the disclosed embodiments.

FIGS. 4A and 4B illustrate exemplary hinges for transaction card 100 consistent with the disclosed embodiments. While various hinges are shown in FIGS. 4A and 4B, these are merely exemplary, and other hinges may be used. In some embodiments, hinge 125 may comprise a living hinge. FIG. 4A illustrates an exemplary living hinge 425, consistent with the disclosed embodiments. As used herein "living hinge" may refer to any flexible hinge made from the same material as the pivotable components connected by the living hinge. For example, card stand 120 may be integrally formed with substrate 110 and may further form a living hinge 425 between card stand 120 and substrate 110. Living hinge 425 may operate as described above with respect to hinge 125. Substrate 110 may optionally be formed from multiple components (as denoted by the dotted line in FIG. 4A), such as front card substrate 211 and rear card substrate 212. In such embodiments, card stand 120 and living hinge 425 may be integrally formed with rear card substrate 212.

Card stand 120 may define a stand thickness ($T_S$) and living hinge 425 may have a hinge thickness ($T_H$). Transaction card may be configured such that hinge thickness $T_H$ is thinner than the stand thickness $T_S$ along a length of the living hinge, as shown in FIG. 4A. This may enable substrate 110 and card stand 120 to be more rigid than living hinge 425 to allow transaction card 100 to be propped in the upright position. Conversely, living hinge 425 may be more flexible than card stand 120 and substrate 110 to allow hinge 425 to rotate card stand 125 between the stowed and deployed positions. Living hinge 425 may allow card stand 125 to rotate into recess 220 and be disposed within recess 220 when in the stowed position. Accordingly, recess 220 may have a depth ($D_R$) that is substantially equal to stand thickness $T_S$. Depth $D_R$ therefore may be sufficient to stow card stand 120 therein when in the stowed position such that an outer surface 412 of card stand 120 is substantially planar with an outer surface of second card surface 152. In some embodiments, depth $D_R$ may be greater or less than stand thickness $T_S$. For example, transaction card 100 may have a bulge or recess where card stand 120 is stowed.

Living hinge 425 may be formed in various ways. For example, living hinge 425, substrate 110 (or rear card substrate 212) and card stand 120 may be molded together using a molding process (e.g., injection molding, etc.). Accordingly, substrate 110 along second card surface 152 and card stand 120 may comprise a unitary section of material. In other embodiments, living hinge 425 may be formed by cutting, etching, or otherwise removing material from substrate 110. For example, where substrate 110 comprises multiple layers or card substrates, rear card substrate 212 may be formed as a substantially planar card layer. Living hinge 425 may be formed by removing material along the length of rear card substrate 212. The removed material (e.g., by cutting, etc.) may extend partially into the thickness of rear card substrate 212 and/or card stand 120, leaving a hinge thickness $T_H$ to form living hinge 425.

FIG. 4B illustrates an exemplary mechanical hinge 435 consistent with the disclosed embodiments. Mechanical hinge 435 may be any form of hinge suitable to connect card stand 120 with transaction card 100 such that card stand is pivotable between the stowed position and the deployed position. In one embodiment, mechanical hinge 435 may comprise a pin joint. The pin joint may be a revolute joint with one rotational degree of freedom about a pin axis. For example, mechanical hinge 435 may include a pin 436 disposed within card stand 120 and/or substrate 110. Pin 436 may extend the length of card stand 120, or may comprise multiple pins 436 at various locations along hinge axis 111, for example at each end of card stand 120. Pin 436 may be formed from a variety of materials, including metal (e.g., aluminum, steel, etc.), plastic (e.g. polycarbonate, polyvinyl chloride, etc.) or any other suitable material. Mechanical hinge 435 may also include various other types of hinges known to one of skill in the art.

Figure 5:
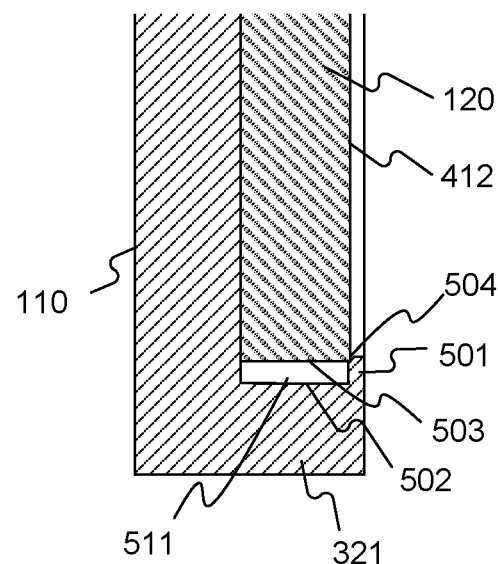
FIG. 5 illustrates an exemplary detent for maintaining the card stand in the stowed position, consistent with the disclosed embodiments.

Transaction card 100 may also have a detent for holding card stand 120 in the stowed position. The detent may be any structure configured to provide a resistive force that must be overcome to move card stand 120 out of the stowed position. Accordingly, the detent may prevent unwanted drift of card stand 120 from the stowed position towards the deployed position. FIG. 5 illustrates exemplary detent 501 for maintaining card stand 120 in the stowed position, consistent with the disclosed embodiments. As described above, transaction card 100 may comprise a ledge 321 adjacent to an edge of card stand 120 when in the stowed position. Ledge 321 may have an upstanding wall 502 along an interior of recess 220. Detent 501 may be formed on upstanding wall 502, contacting card stand 120 to retain card stand 120 in the stowed position. As described above, detent 501 may include a notch formed along its length to act as access feature 301. The notch may expose a bottom edge 503 of card stand 120 when card stand 120 is in the stowed position (e.g., similar to access feature 301 shown in FIG. 3).

In some embodiments, detent 501 may comprise a tab extending from upstanding wall 502 in substantially the same plane as transaction card 100 (e.g., same plane as first or second card surfaces 151, 152). Transaction card 100 may have multiple tabs positioned along ledge 321 for holding card stand 120 in the stowed position. Various other forms of detents may also be used. For example, detent 501 may comprise a ridge extending along upstanding wall 502 that is disposed over outer surface 412 of card stand 120 when card stand 120 is in the stowed position. Alternatively, detent 501 may contact an outer edge 504 of card stand 120 without extending over outer surface 412. Detent 501 may also form a groove 511 along upstanding wall 120, the groove 511 accepting outer edge 504 of card stand 120 in the groove 511 when card stand 120 is in the stowed position. Card stand 120 may have corresponding features, such as bumps, notches, grooves, tabs, etc. for interfacing with detent 501. Detent 501 is configured to contact card stand 120 to resist drift thereof from recess 220, and may be disposed along ledge 321. However, detent 501 may also be formed along other portions of transaction card 100, for example, along other portions around recess 220.

Card stand 120 may be held in the stowed position by various other means as well. In some embodiments, card stand 120 may be configured to fit tightly within recess 220 such that card stand 120 does not drift out of the stowed position. In some embodiments, card stand 120 may be held in the stowed position by a magnet. Accordingly, a magnet may be disposed on card stand 120, substrate 110, or both. Various other means for holding card stand 120 in the stowed position may also be used.

Figure 6:
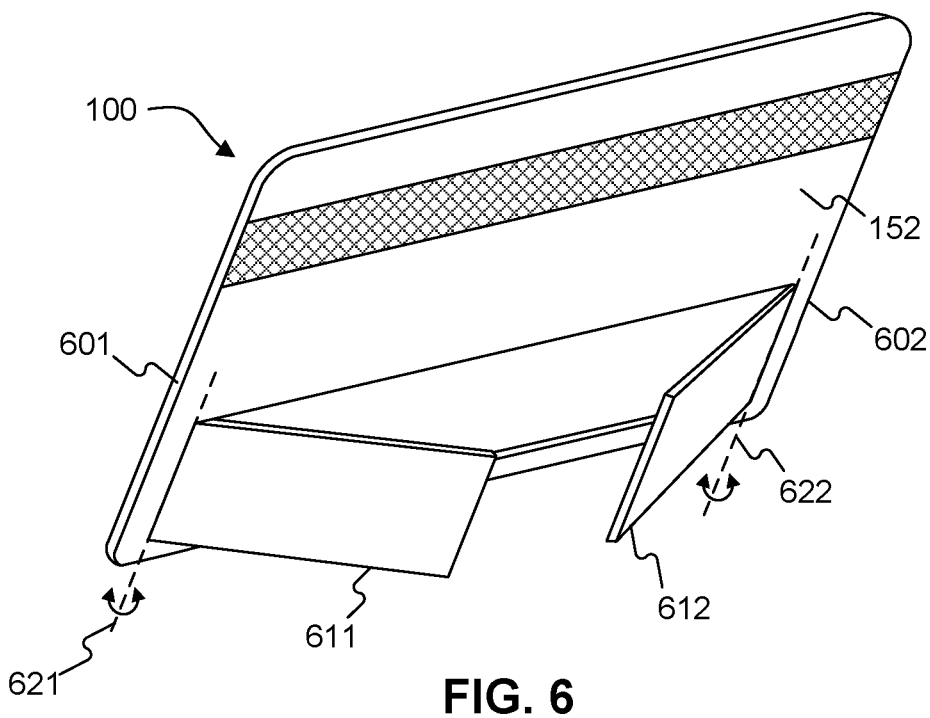
FIG. 6 illustrates an exemplary transaction card with a plurality of card stand sections, consistent with the disclosed embodiments.

In some embodiments, card stand 120 may comprise a plurality of card stand sections, each the card stand section being pivotable relative to second card surface 152. FIG. 6 illustrates an exemplary transaction card 100 with a plurality of card stand sections, consistent with the disclosed embodiments. For example, transaction card 100 may have a first card stand section 611 and a second card stand section 612. Each card stand section 611, 612, may be pivotable around a separate axis. For example, card stand section 611 may be pivotable around axis 621 and card stand section 612 may be pivotable around axis 622. The card stand sections shown in FIG. 6 are merely exemplary. Similar to card stand 120, card stand sections 611 and 612 may have a variety of shapes, sizes, orientations, and/or configurations. In the embodiment shown in FIG. 6, axis 621 and axis 622 may be parallel to sides 601, 602 of transaction card 100.

Figure 7:
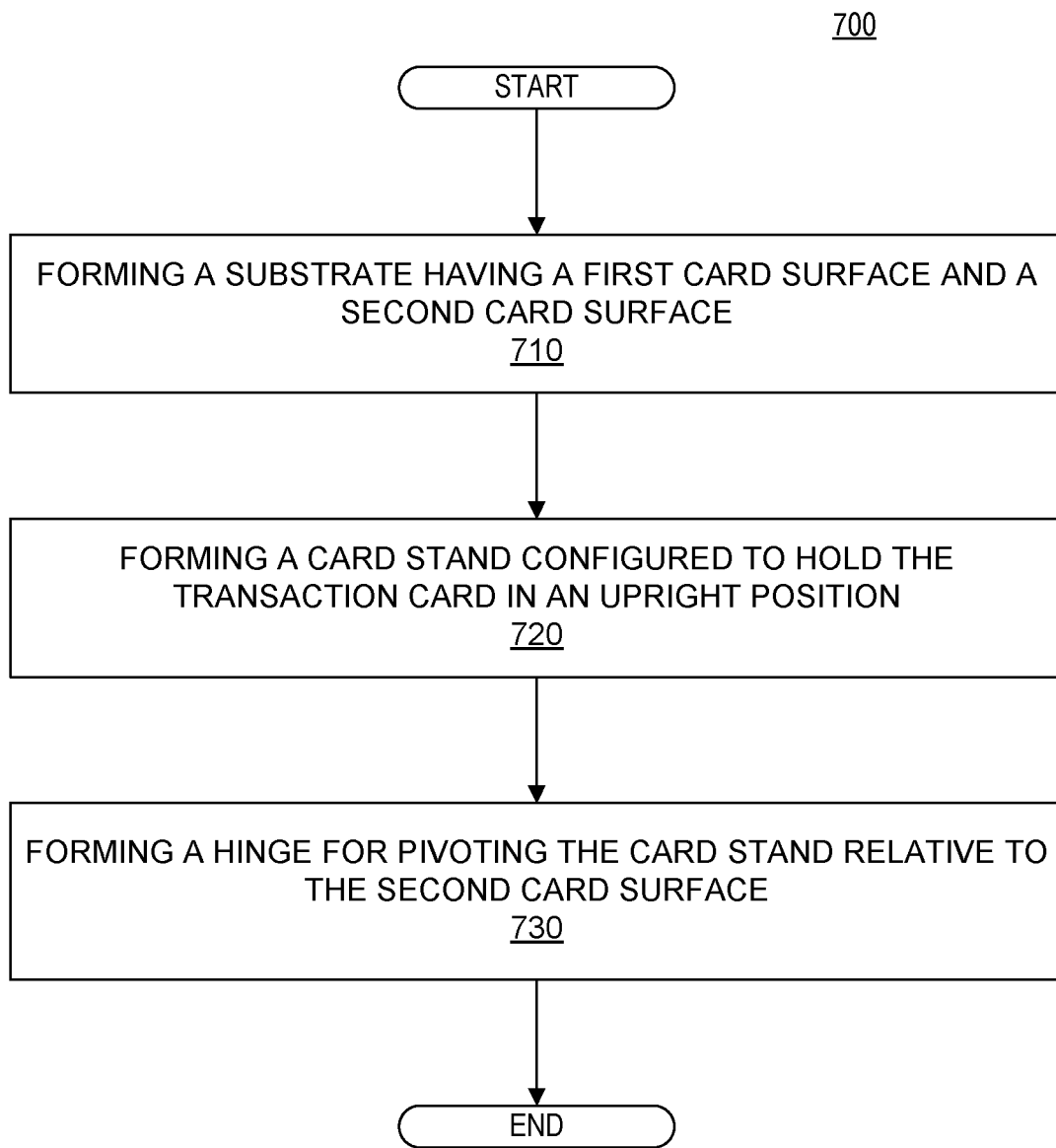
FIG. 7 is a flowchart illustrating an exemplary process for forming a transaction card with a card stand consistent with the disclosed embodiments.

FIG. 7 is a flowchart illustrating an exemplary process 700 for forming a transaction card with a card stand consistent with the disclosed embodiments. In step 710, process 700 may include forming a substrate of the transaction card. The substrate may have a first card surface and a second card surface. For example, substrate 110, having first card surface 151 and second card surface 152, may be formed as part of step 710. Substrate 110 may be formed, for example, by a molding process (e.g., injection molding, compression molding, etc.), milling process, stamping process, cutting process, sheet forming process, or combinations thereof.

As described above, substrate 110 may be formed of multiple layers or card substrates. Accordingly, step 710 may further include forming multiple card substrates (e.g., front card substrate 211 and rear card substrate 212) and joining them together. Each card substrate may be formed as described above for substrate 110, for example, by a molding process, milling process, stamping process, cutting process, sheet forming process, or combinations thereof. Front card substrate 211 and rear card substrate 212 (and/or additional card substrates) may be joined by an adhesive (e.g., glue, epoxy, tape, etc.), corresponding attachment features on the card substrates, fasteners, and/or any other type of joining technique or method. Step 710 may optionally include disposing one or more electronic components within substrate 110. For example, one or more electronic components may be disposed between front card substrate 211 and rear card substrate 212 before joining them together.

In step 720, process 700 may include forming a card stand configured to hold the transaction card in an upright position. For example, step 720 may include forming card stand 120, described above. Card stand 120 may be a substantially planar component configured to support transaction card 100. Card stand 120 may be formed through a molding process, milling process, stamping process, cutting process, sheet forming process, or any other suitable process, similar to substrate 110. In some embodiments, card stand 120 may be formed separately from substrate 110. In other embodiments, card stand 120 may be integrally formed with substrate 110 and thus steps 710 and 720 may be performed together. For example, card stand 120 may be integrally formed with rear card substrate 212, which may be a substantially planar substrate. Accordingly, card stand 120 may be formed concurrently with rear card substrate 212.

In Step 730, process 700 may include forming a hinge for pivoting the card stand relative to the second card surface. This may include forming hinge 125, described above. In embodiments where hinge 125 is a living hinge, step 730 may be performed concurrently with either or both of the previous steps. For example, hinge 125, substrate 110, and/or card stand 120 may be integrally formed together through a molding process or other suitable process. Where card stand 120 is formed along with rear card substrate 212, step 730 may comprise removing material along a length of rear card substrate 212. The removed material may form a cut or slit that may extend partially through a thickness of rear card substrate 212, forming a living hinge portion. The living hinge (e.g., living hinge 425) may also be formed by shaving, drilling, etching, or otherwise removing material from substrate 110.

In embodiments where hinge 125 may be a mechanical hinge (e.g., mechanical hinge 435), step 730 may include attaching card stand 120 and substrate 110 to the hinge. In some embodiments, mechanical hinge 435 may not be a separate component but may be formed as part of card stand 120 and substrate 110. In these embodiments, step 730 may include further machining and/or processing card stand 120 and/or substrate 110. For example, step 730 may include forming one or more knuckles for receiving a pin in card stand 120 and/or substrate 110. The knuckles may be formed, for example, by drilling card stand 120 and/or substrate 110, or the knuckles may be formed with card stand 120 and/or substrate 110 (e.g., through a molding process). Step 730 may further include disposing a pin (e.g., pin 436) in mechanical hinge 435, thereby allowing card stand 120 to rotate about the pin.

The foregoing description has been presented for purposes of illustration. It is not exhaustive and is not limited to the precise forms or embodiments disclosed. Modifications and adaptations of the embodiments will be apparent from consideration of the specification and practice of the disclosed embodiments.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps. It is intended, therefore, that the specification and examples be considered as exemplary only, with a true scope and spirit being indicated by the following claims and their full scope of equivalents.

What is claimed is:

1. A method of manufacturing a transaction card, comprising:
   forming a substrate having a first card surface and a second card surface opposite the first card surface;
   forming a recess in the second card surface extending into the substrate;
   forming a card stand; and
   forming a hinge between the card stand and the transaction card such that the card stand is pivotable about the hinge between a stowed position in which the card stand is disposed within the recess and a deployed position in which the card stand is angled outward relative to the second card surface.

2. The method of claim 1, wherein forming the hinge comprises forming a living hinge having a hinge thickness.

3. The method of claim 2, wherein forming the living hinge comprises forming a living hinge having a hinge thickness which is thinner than a thickness of the card stand along a length of the living hinge.

4. The method of claim 2, wherein forming the substrate, forming the card stand, and forming the living hinge comprises forming the substrate, card stand, and living hinge of a unitary section of material.

5. The method of claim 1, wherein forming the hinge comprises attaching a hinge between the card stand and the substrate.

6. The method of claim 1, wherein forming the hinge comprises forming a hinge having a pin joint.

7. The method of claim 6, wherein forming the hinge comprises forming, in at least one of the substrate or the card stand, a plurality of knuckles adapted to receive a pin.

8. The method of claim 1, wherein forming the substrate comprises at least one of molding, milling, stamping, cutting, or sheet-forming.

9. The method of claim 1, wherein forming the substrate comprises:
   forming a first card substrate comprising the first card surface;
   forming a second card substrate comprising the second card surface; and
   joining the first card substrate and the second card substrate with an adhesive.

10. The method of claim 9, wherein forming the hinge comprises forming a hinge between the card stand and the second card substrate.

11. The method of claim 9, wherein forming the card stand and forming the second card substrate comprises forming a card stand and a second card substrate of a unitary section of material.

12. The method of claim 9, wherein forming the hinge and the second card substrate comprises forming a hinge and a second card substrate of a unitary section of material.

13. The method of claim 1, wherein:
   forming the hinge further comprises forming a hinge having a hinge axis substantially parallel to a lower edge of the transaction card; and
   forming the card stand comprises forming a card stand which is pivotable about the hinge axis.

14. The method of claim 13, wherein the method further comprises disposing a magnetic strip extending substantially across the second card surface and substantially parallel to the lower edge of the transaction card, the hinge axis and the magnetic strip being offset from one another.

15. The method of claim 13, wherein the method further comprises disposing a transaction component within the substrate such that the hinge axis and the transaction component are offset from one another.

16. The method of claim 1, wherein forming the recess comprises forming a recess having a depth sufficient to receive the card stand when the card stand is in the stowed position, such that an outer surface of the card stand is substantially planar with an outer surface of the substrate.

17. The method of claim 1, wherein the method further comprises forming a notch through an upstanding wall along an interior of the recess, the notch exposing an outer edge of the card stand when the card stand is in the stowed position.

18. The method of claim 1, wherein the method further comprises forming a detent on an upstanding wall along an interior of the recess, the detent contacting the card stand to retain the card stand in the stowed position.

19. The method of claim 18, wherein forming the detent comprises forming a detent having at least one of a tab, a ridge, or a groove.

20. The method of claim 1, wherein forming the card stand comprises forming a plurality of card stand sections, the card stand sections being pivotable relative to the second card surface.

* * * * *